No. 770,009. Patented September 13, 1904.

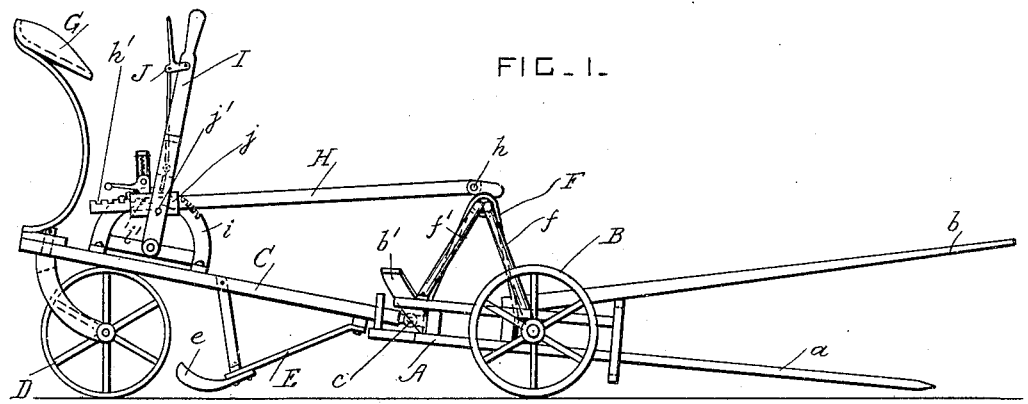
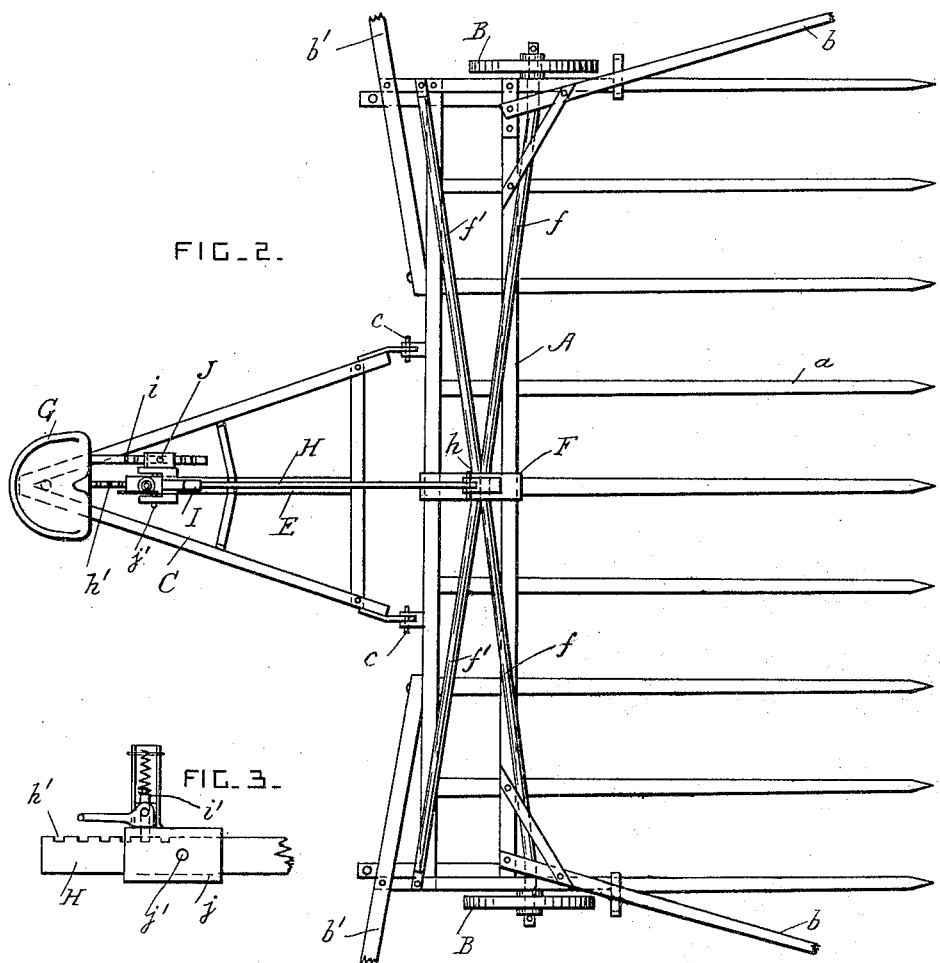
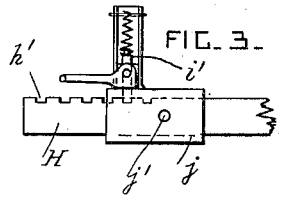

UNITED STATES PATENT OFFICE.

MARION R. JENKINS, OF BROWNING, MISSOURI.

HAY-RAKE.

SPECIFICATION forming part of Letters Patent No. 770,009, dated September 13, 1904.

Application filed March 13, 1903. Serial No. 147,652. (No model.)

*To all whom it may concern:*

Be it known that I, MARION R. JENKINS, a citizen of the United States, residing at Browning, in the county of Linn and State of Missouri, have invented certain new and useful Improvements in Hay-Rakes; and I do hereby declare the following to be a full, clear, and exact description of the invention, such as will enable others skilled in the art to which it appertains to make and use the same.

This invention relates to wheeled hay-rakes; and it consists in the novel construction and combination of the parts hereinafter fully described and claimed.

In the drawings, Figure 1 is a side view of the rake. Fig. 2 is a plan view of the same. Fig. 3 is a detail.

A is a rake head or frame provided with teeth $a$.

B represents the ground-wheels which support the rake-head, and $b\ b'$ are draft attachments of any approved construction.

C is a lifting frame which is pivoted to the rake-head by pins $c$. This frame C is preferably triangular in form, and it is provided with a caster-wheel D under its rear part, which is the apex of the triangular frame.

E is a jumper-bar secured in an inclined position to the middle part of the frame C in front of the caster-wheel. This bar is preferably provided with a runner $e$ for bearing on the ground; but it may have any approved equivalent device in place of the runner. This shoe or runner being arranged in front of the wheel D acts as a safeguard to prevent the breaking or hanging up of the said wheel. The shoe or runner does not come in contact with the ground when raking on level ground; but as soon as the wheel D drops into a depression the shoe comes in contact with the ground and carries the frame C.

F is a frame or bracket secured to the middle part of the rake-head. Trusses $f$ and $f'$ extend between the top of the said bracket and the end portions of the rake-head. These trusses are close together at the bracket and incline downwardly to the end portions of the frame. The front truss, $f$, also inclines forwardly at each end, and the rear truss, $f'$, inclines rearwardly at each end, so the frame is securely braced by the diverging truss-rods and cannot be twisted by the weight of the load of hay which accumulates on the teeth.

G is the seat for the driver, carried by the lifting frame C.

H is the lifting-bar, which is pivoted at its front end to the top of the bracket F by a pin $h$ and which has notches $h'$ in its rear end portion.

I is an operating-lever pivoted to a notched quadrant $i$, which is secured to the frame C.

J is a catch or trigger which connects the lever I with the quadrant. The lever I is connected with either of the notches $h'$ of the lifting-bar by means of a spring-pressed catch-bolt $i'$, which can be moved from one notch to another, so as to vary the lift of the rake-teeth. The catch-bolt $i'$ is supported by a block $j$, which is pivoted to the operating-lever by a pin $j'$ at each side of the block.

The rake-teeth are raised or lowered, as required, by means of the operating-handle, which is then held in position by the notched quadrant.

The jumper-bar enables the caster-wheel to pass over the irrigating-ditches with which the western meadows are much cut up without injury. The jumper-bar prevents the caster-wheel from dropping into the ditch by striking the opposite bank of the ditch. The peculiar arrangement of the truss-rods, one of which is in tension and the other in compression, causes the rake-head to be very strongly braced, and the rake can be used on rough and uneven ground without being twisted and racked to pieces.

What I claim is—

In a hay-rake, the combination, with a wheeled rake-head, and a wheeled lifting frame pivoted to it; of a bracket secured to the middle part of the rake-head, two inclined and diverging trusses having their middle parts arranged near together and secured to the said bracket and their end portions spread apart and secured to the end portions of the rake-head, and a lifter-bar connected with the said bracket.

In testimony whereof I affix my signature in presence of two witnesses.

MARION R. JENKINS.

Witnesses:
ALTA OWEN,
C. E. MURPHY.